United States Patent
Arimura

(10) Patent No.: US 7,632,598 B2
(45) Date of Patent: *Dec. 15, 2009

(54) FUEL CELL WITH POLYMER-BASED FUEL ABSORBING MEMBER

(75) Inventor: Tomoaki Arimura, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 928 days.

This patent is subject to a terminal disclaimer.

(21) Appl. No.: 11/285,654

(22) Filed: Nov. 22, 2005

(65) Prior Publication Data

US 2006/0141296 A1 Jun. 29, 2006

(30) Foreign Application Priority Data

Dec. 24, 2004 (JP) ............... 2004-373901

(51) Int. Cl.
- H01M 2/16 (2006.01)
- H01M 2/08 (2006.01)
- C08F 4/04 (2006.01)
- C08F 26/06 (2006.01)

(52) U.S. Cl. .................. 429/38; 429/35; 526/219.6; 526/258

(58) Field of Classification Search ............. 429/12–46; 526/219.6, 258

See application file for complete search history.

(56) References Cited

U.S. PATENT DOCUMENTS 3,271,358 A * 9/1966 Coran et al. ................. 524/299
6,183,914 B1 2/2001 Yao et al.

FOREIGN PATENT DOCUMENTS

| JP | 2002175838 A * | 6/2002 |
| JP | 2004-047400 | 2/2004 |
| JP | 2004-127659 | 4/2004 |
| JP | 2004-146179 | 5/2004 |

OTHER PUBLICATIONS

Mosnacek et al., "Perparation of 4-Vinylbenzil and Photochemical Properties of Its Homopolymer and Copolymer with Styrene," 2004 (Jan. 24, 2004), Macromolecules, vol. 37, 1304-1311.*
Machine translation of JP 2002-175838 (Jun. 2002).*
Machine translation of JP 2004-047400 (Feb. 2004).*
Machine translation of JP 2004-127659 (Apr. 2004).*

* cited by examiner

Primary Examiner—Basia Ridley
Assistant Examiner—Emily Nytko-Lutz
(74) Attorney, Agent, or Firm—Blakely, Sokoloff, Taylor & Zafman LLP

(57) ABSTRACT

A fuel cell comprises a cell unit in which a plurality of single cells are laminated, each of which has a membrane type electrode unit including a fuel electrode to which an aqueous methanol solution is supplied as a fuel, an air electrode to which an oxidizing gas is supplied, and an electrolyte membrane interposed between the fuel electrode and the air electrode, and a fuel absorbing member disposed around the cell unit, the fuel absorbing member being composed of a polymer represented by the following formula (I)

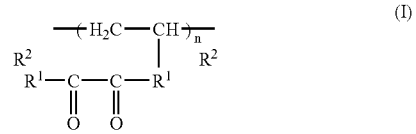

where $R^1$ denotes a cationic aromatic functional group, $R^2$ denotes an anion, and n is an integer of 2 or more.

9 Claims, 3 Drawing Sheets

US 7,632,598 B2

FUEL CELL WITH POLYMER-BASED FUEL ABSORBING MEMBER

CROSS-REFERENCE TO THE RELATED APPLICATIONS

This application is based upon and claims the benefit of priority from prior Japanese Patent Application No. 2004-373901, filed Dec. 24, 2004, the entire contents of which are incorporated herein by reference.

BACKGROUND

1. Field

The present invention relates to a fuel cell.

2. Description of the Related Art

A fuel cell, for example, a direct methanol fuel cell (DMFC) of the active type has a structure comprising a single cell having a membrane type electrode unit including a fuel electrode to which an aqueous methanol solution is supplied as a fuel, an air electrode to which an oxidizing gas is supplied, and an electrolyte membrane interposed between these electrodes; and a fuel separator and an oxidizing gas separator disposed at both sides of the membrane type electrode unit.

Such a fuel cell has not been provided with safety measures against an incidental leakage of a fuel.

On the other hand, Jpn. Pat. Appln. KOKAI Publication No. 2004-146179 discloses a fuel cell of a structure having a moisture absorber disposed in a piping system for supplying an oxidizing gas such as air to an air electrode. However, the moisture absorber is disposed in the piping system as a moisture releasing member for preventing an electrolyte membrane from being dried, and it is not intended to prevent leakage of a fuel.

Jpn. Pat. Appln. KOKAI Publication No. 2004-127659 discloses that, when an aqueous methanol solution is supplied as a fuel to a fuel cell, the aqueous methanol solution is stored in a storage material (absorbent) composed of a high molecular compound containing an imidazolium ion in a skeleton, and the aqueous methanol solution is released from the storage material.

DETAILED DESCRIPTION

A fuel cell according to one embodiment of the invention will be specifically described below with reference to the accompanying drawings.

The fuel cell of this embodiment has a structure comprising a cell unit in which a plurality of single cells are laminated, and a fuel absorbing member disposed around the cell unit. The single cell has a membrane type electrode unit including a fuel electrode to which an aqueous methanol solution is supplied as a fuel, an air electrode to which an oxidizing gas is supplied, and an electrolyte membrane interposed between the fuel electrode and the air electrode.

Figure 1:
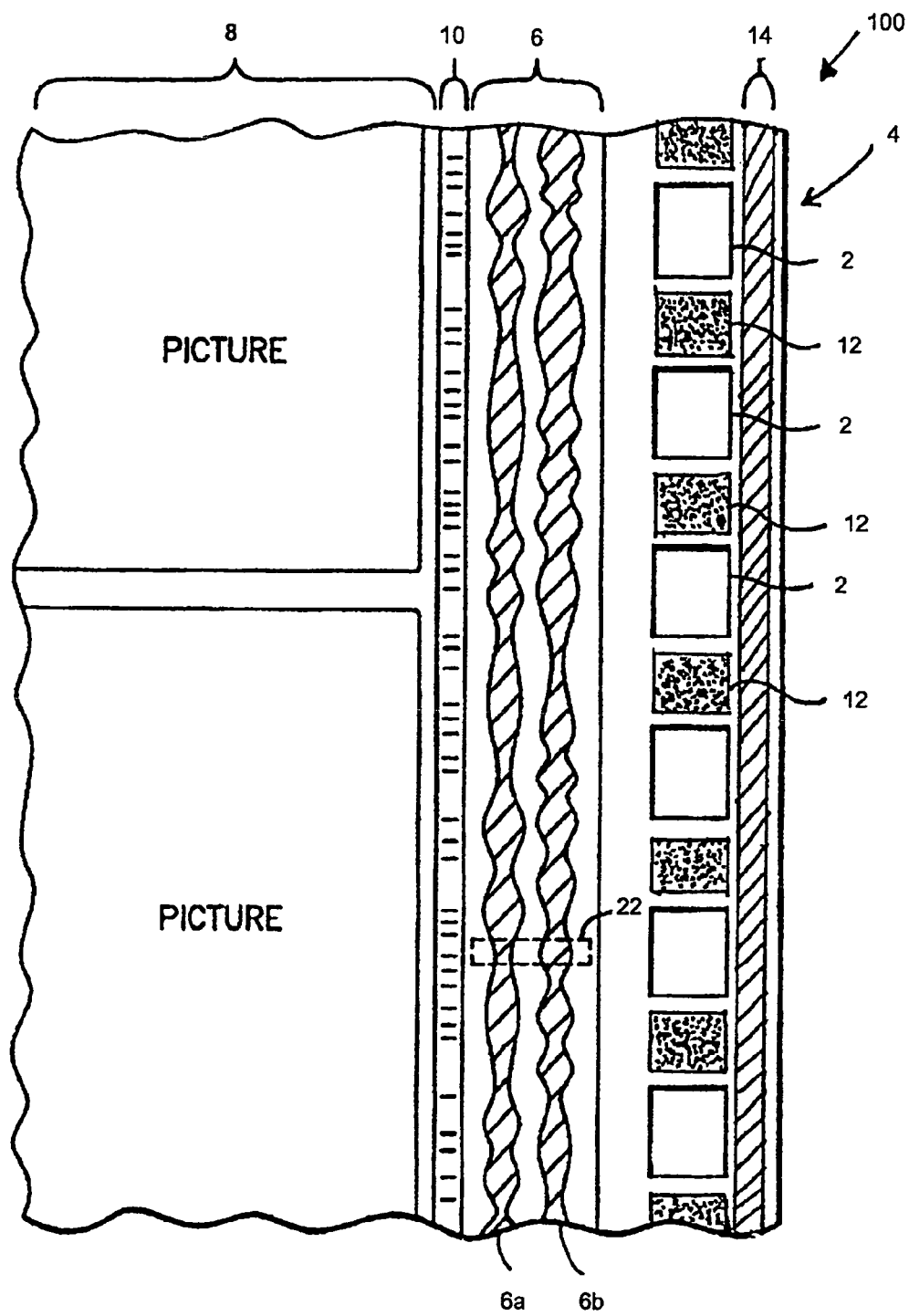
FIG. 1 is a schematic perspective view of a cell unit of a direct methanol fuel cell according to one embodiment of the invention.
Figure 2:
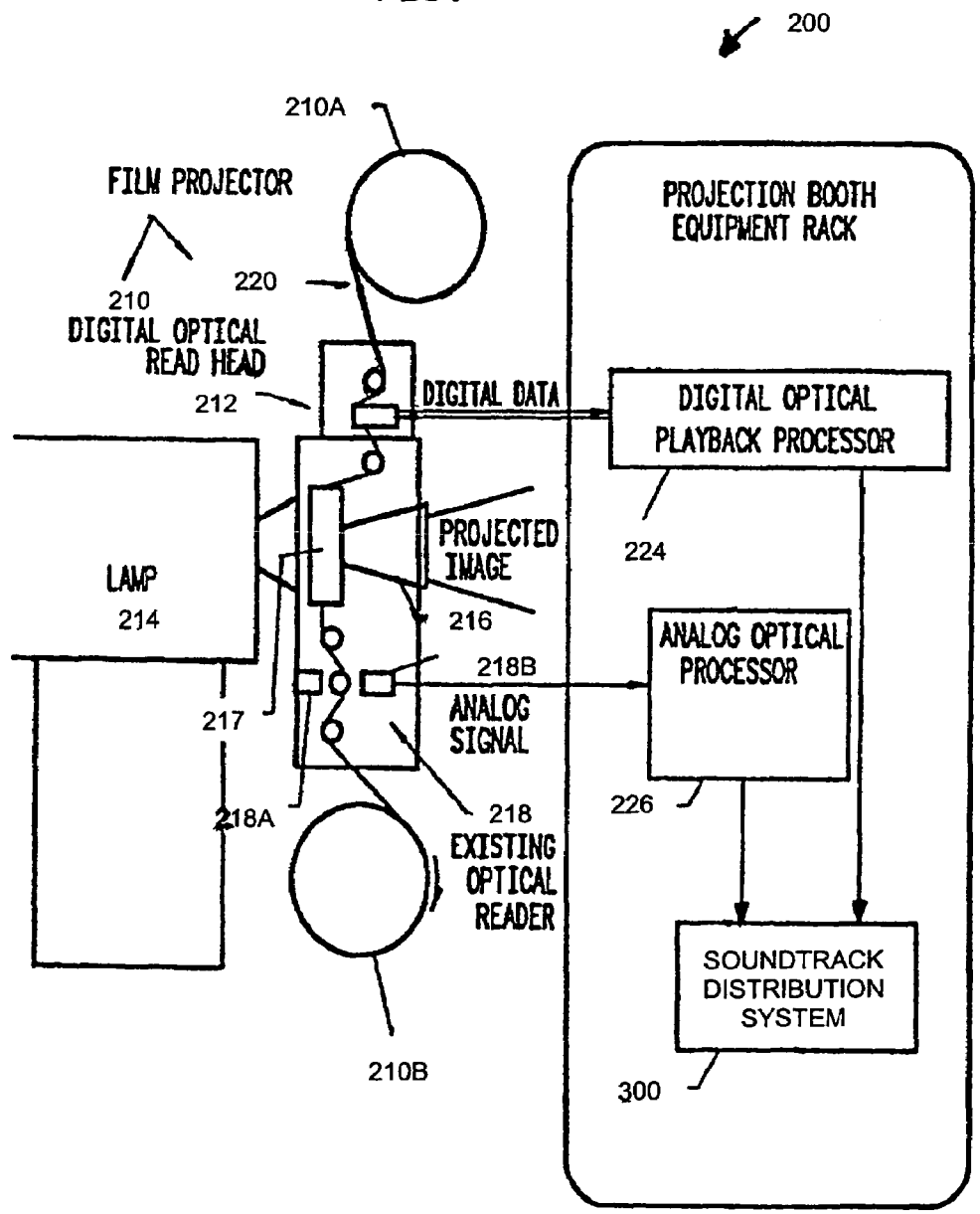
FIG. 2 is an exploded perspective view schematically showing a single cell for configuring the cell unit in FIG. 1.
Figure 3:
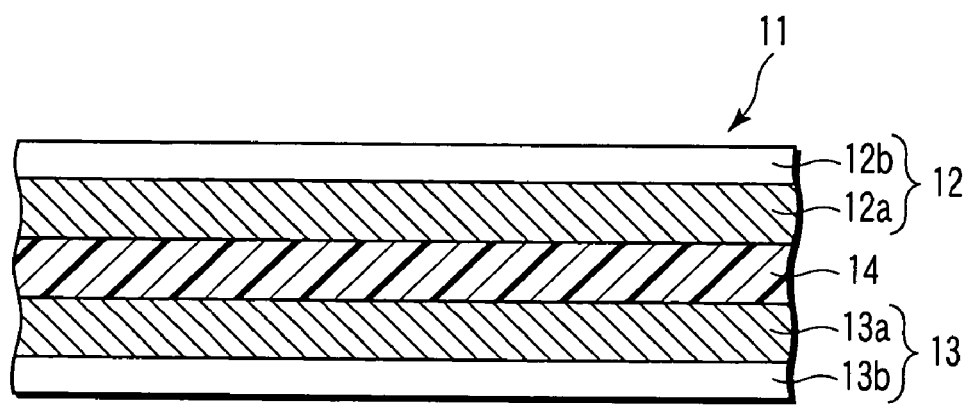
FIG. 3 is a sectional view showing a membrane type electrode unit assembled in the single cell in FIG. 2.
Figure 4:
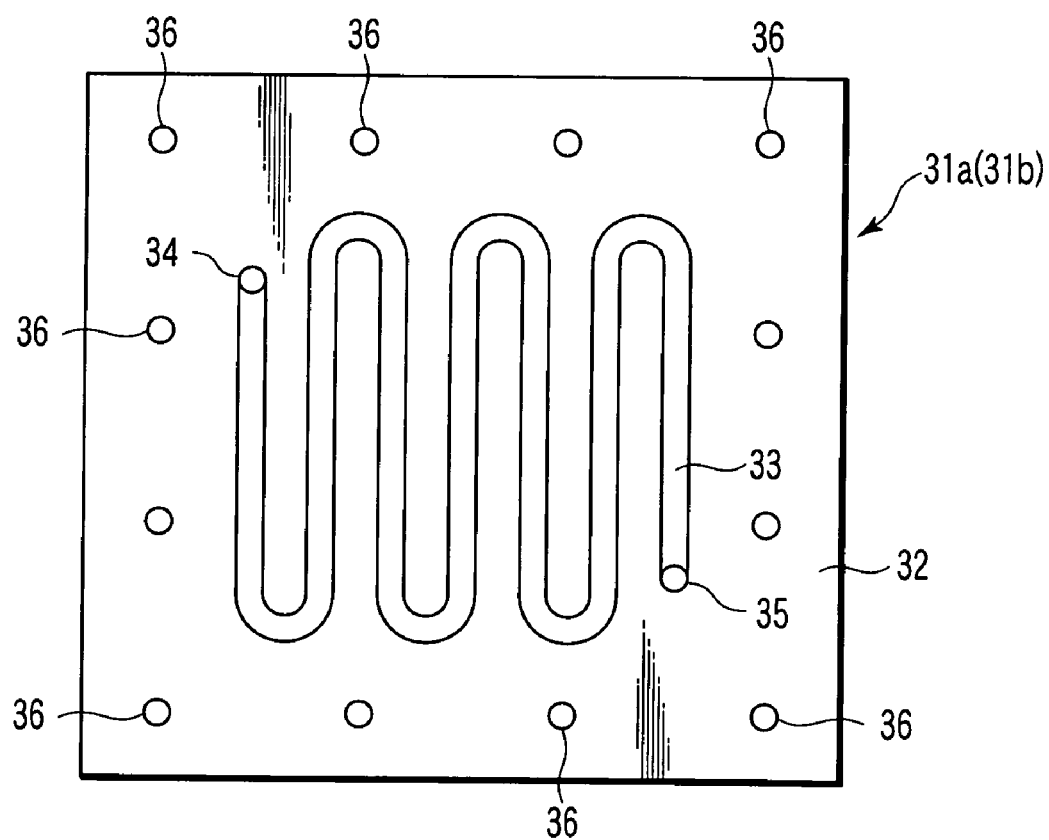
FIG. 4 is a plan view showing a fuel passage plate and an oxidizing gas passage plate assembled in the single cell in FIG. 2.

Specifically, the fuel cell has a structure as shown in FIGS. 1 to 4. FIG. 1 is a schematic perspective view of a cell unit of an active type direct methanol fuel cell according to the embodiment, FIG. 2 is an exploded perspective view schematically showing a single cell for configuring the cell unit in FIG. 1, FIG. 3 is a sectional view showing a membrane type electrode unit assembled in the single cell in FIG. 2, and FIG. 4 is a plan view showing a fuel passage plate and an oxidizing gas passage plate assembled in the single cell in FIG. 2.

The cell unit 1 has a structure in which a laminated body obtained by laminating, for example, 10 to 40 single cells 2 is held by two support plates 3a, 3b, a plural bolts 4 are penetrated in a laminating direction of the single cells 2 and support plates 3a, 3b, and nuts (not shown) are screwed at the other end, whereby the single cells 2 and support plates 3a, 3b are integrally tightened. For example, a band-like fuel absorbing member 5 is fixed, for example, by winding around four laminated surfaces of the cell unit 1, and adhering to four sides of the support plates 3a, 3b. The cell unit 1 having the band-like fuel absorbing member 5 wound therearound is contained in a casing (not shown).

The single cell 2 to be assembled in the cell unit 1 has a membrane type electrode unit 11 as shown in FIG. 2. A frame-shaped seal member 21a, a fuel passage plate 31a, and a current collector plate 41a are arranged and laminated in this order at one side of the membrane type electrode unit 11. A frame-shaped seal member 21b, an oxidizing gas passage plate 31b, and a current collector plate 41b are arranged and laminated in this order at the other side of the membrane type electrode unit 11.

The membrane type electrode unit 11 comprises, as shown in FIG. 3, a fuel electrode 12 to which a fuel is supplied, an air electrode 13 to which an oxidizing gas is supplied, and an electrolyte membrane 14 interposed between these electrodes 12 and 13. The fuel electrode 12 is composed of a catalyst layer 12a which contacts with the electrolyte membrane 14, and a diffusion layer 12b having a carbon paper and laminated on the catalyst layer 12a. The air electrode 13 is composed of a catalyst layer 13a which contacts with the electrolyte membrane 14, and a diffusion layer 13b having a carbon paper and laminated on the catalyst layer 13a.

The passage plates 31a, 31b comprise, as shown in FIG. 4, a passage plate main body 32 made of, for example, carbon, a groove passage 33 for fuel (or oxidizing gas) formed so as to meander in the portion opposite to the inside of the frame of the frame-shaped seal member 21a (21b) of the passage plate main body 32, a feed port 34 for fuel (or oxidizing gas) formed so as to penetrate through the main body 32 at one end of the passage 33, and a discharge port 35 for fuel (or oxidizing gas) formed so as to penetrate through the main body 32 at the other end of the passage 33. At four sides including four corners of the passage plate main body 32, holes 36 are opened through which bolts for integrally tightening the single cells and support plates 3a, 3b are inserted.

The fuel absorbing member is composed of a polymer represented by the following formula (I):

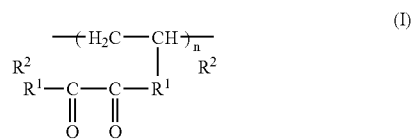

where $R^1$ denotes a cationic aromatic functional group; $R^2$ denotes an anion; and n is an integer of 2 or more.

In the above formula (I), preferably, $R^1$ is a cationic nitrogen containing aromatic functional group, and $R^2$ is a halogen ion such as chlorine, fluorine, bromine, or iodine.

In the above formula (I), n is preferably an integer of 2 to 150000, more preferably 100 to 34000, and most preferably 3000 to 30000.

The fuel absorbing member is preferably composed of a polymer represented by the following formula (II):

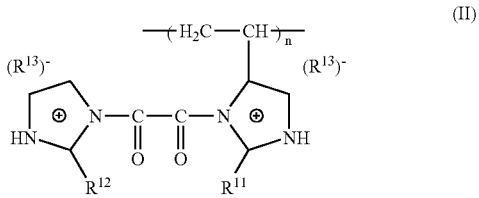

where $R^{11}$ and $R^{12}$ each denote a hydrogen or hydrocarbon group, which are either the same or different; $R^{13}$ denotes a halogen element; and n is an integer of 2 or more.

In the formula (II), the hydrocarbon group of $R^{11}$, $R^{12}$ is preferably an alkyl group having 1 to 20 carbon atoms.

In the formula (II), n is preferably an integer of 2 to 150000, more preferably 100 to 45000, and most preferably 3000 to 30000.

The fuel absorbing member is not limited to the band-like shape as shown in FIG. 1 to be wound around the cell unit. For example, the fuel absorbing member may be provided completely or partially within the casing in which the cell unit is contained. In such a form, the fuel absorbing material can be mounted in a film state inside of the casing or mounted in a cartridge type.

According to the embodiment described herein, the fuel absorbing member made of a polymer represented by the formula (I) is disposed around the cell unit. Consequently, in the event of an unexpected leakage of an aqueous methanol solution (fuel) from the cell unit, the fuel can be absorbed promptly and efficiently by the high fuel absorbing speed and large absorbing amount per unit volume of fuel of the fuel absorbing member, and leakage from the casing containing the unit cell can be prevented.

Further, since the fuel absorbing member is low in releasing properly (evaporating property) of the fuel absorbed at an operating temperature, the fuel once absorbed is not released again, and it is prevented from being evaporated into a gas and from being released outside.

The fuel absorbing member has a low expansion property, and therefore, suppresses expansion due to absorption of the aqueous methanol solution. This prevents deformation of the casing in which the fuel absorbing member is contained.

Therefore, a fuel cell capable of preventing unexpected leakage of the aqueous methanol solution (fuel) and ensuring high safety can be provided.

In particular, since the fuel absorbing MEMBER made of a polymer represented by formula (II) has higher fuel absorbing speed, large absorbing amount per unit volume of fuel, excellent low releasing property of fuel, and low expansion property, a fuel cell capable of preventing more securely unexpected leakage of the aqueous methanol solution (fuel) and ensuring higher safety can be provided.

Examples of the invention will be more specifically described below.

SYNTHESIS EXAMPLE 1

A cooling tube, a dropping funnel, a stirrer and a magnetic stirrer were attached in a reaction apparatus furnished with a two-neck 200-mL round bottom reaction flask, and in this container, 0.8 g (molecular weight 227; $3.5 \times 10^{-3}$ mol) of 1,1'-oxalyl imidazole, 0.22 g (molecular weight 62; $3.5 \times 10^{-3}$ mol) of vinyl chloride, and 5 mL of triethylamine were dissolved in 80 mL of dichloroethane. After agitating the reaction container in an ice bath for 4 hours, a reaction solution was filtered, and a sediment was separated. The solution was removed in vacuo, and a monomer was obtained (yield 96%).

A cooling tube, a dropping funnel, a stirrer and a magnetic stirrer were attached in a two-neck 200-mL round bottom reaction container, 0.8 g of the obtained monomer was dissolved in 60 mL of tetrahydrofuran and contained in the reaction container, and 50 mg of azo-bis(isobutyronitrile) was added, and then, the solution was stirred for 3 hours in reflex at 80° C. Subsequently, while observing pH the by a pH test paper, 0.05N hydrochloric acid was added, and a polymer was taken out in an alkaline-neutral region.

The polymer was identified to be polyvinyl (1,1'-oxalyl imidazole) hydrochloride shown in the following structural formula (A) according to the following infrared spectral data obtained by infrared analysis.

<Infrared Spectral Data>
$3070 \text{ cm}^{-1}$, $3030 \text{ cm}^{-1}$ (aromatic group C—H),
$2470 \text{ cm}^{-1}$ (NH),
$2920 \text{ cm}^{-1}$, $2940 \text{ cm}^{-1}$ (C—H),
$1660 \text{ cm}^{-1}$ (C=C),
$1640 \text{ cm}^{-1}$ (N—C=O)

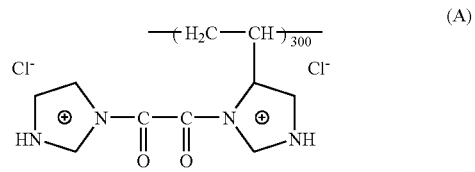

SYNTHESIS EXAMPLE 2

A polymer was synthesized in the same manner as in Synthesis example 1, except that 0.37 g (molecular weight 107; $3.5 \times 10^{-3}$ mol) of vinyl bromide was used instead of vinyl chloride.

The polymer was identified to be polyvinyl (1,1'-oxalyl imidazole) bromide shown in the following structural formula (B) according to the following infrared spectral data obtained by infrared analysis.

<Infrared Spectral Data>
$3070 \text{ cm}^{-1}$, $3030 \text{ cm}^{-1}$ (aromatic group C—H),
$2470 \text{ cm}^{-1}$ (NH),
$2920 \text{ cm}^{-1}$, $2940 \text{ cm}^{-1}$ (C—H),
$1660 \text{ cm}^{-1}$ (C=C),
$1640 \text{ cm}^{-1}$ (N—C=O)

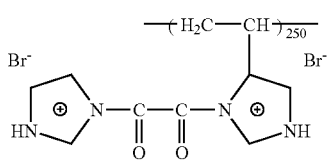

(B)

SYNTHESIS EXAMPLE 3

A polymer was synthesized in the same manner as in Synthesis example 1, except that 0.13 g (molecular weight 36; $3.5 \times 10^{-3}$ mol) of vinyl fluoride was used instead of vinyl chloride.

The polymer was identified to be polyvinyl (1,1'-oxalyl imidazole) hydrofluoride shown in the following structural formula (C) according to the following infrared spectral data obtained by infrared analysis.

<Infrared Spectral Data>
 $3070\ cm^{-1}$, $3030\ cm^{-1}$ (aromatic group C—H),
 $2470\ cm^{-1}$ (NH),
 $2920\ cm^{-1}$, $2940\ cm^{-1}$ (C—H),
 $1660\ cm^{-1}$ (C=C),
 $1640\ cm^{-1}$ (N—C=O)

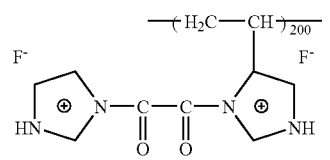

(C)

SYNTHESIS EXAMPLE 4

A polymer was synthesized in the same manner as in Synthesis example 1, except that 0.77 g (molecular weight 220; $3.5 \times 10^{-3}$ mol) of 1,1'-oxalyl-2,2'-dimethyl imidazole was used instead of 1,1'-oxalyl imidazole.

The polymer was identified to be polyvinyl (1,1'-oxalyl-2,2'-dimethyl imidazole) hydrochloride shown in the following structural formula (D) according to the following infrared spectral data obtained by infrared analysis.

<Infrared Spectral Data>
 $3070\ cm^{-1}$, $3030\ cm^{-1}$, $3080\ cm^{-1}$ (aromatic group C—H),
 $2470\ cm^{-1}$ (NH),
 $2920\ cm^{-1}$, $2940\ cm^{-1}$ (C—H),
 $1660\ cm^{-1}$ (C=C),
 $1640\ cm^{-1}$ (N—C=O)

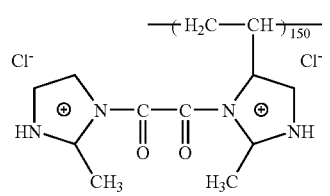

(D)

EXAMPLES 1 to 4

The polymers obtained in Synthesis examples 1 to 4 were dried in air for a day, and absorbers were obtained. These absorbers and an absorber made of soda polyacrylate (Alon T-50 (trademark) of Toa Gosei Co., Ltd.) (Comparative example 1) were evaluated as follows by measuring the absorbing speed of the aqueous methanol solution, the absorbing amount of the aqueous methanol solution, the volatility of methanol, the swelling degree in aqueous methanol solution, and thermal decomposition property.

1) Measurement of Absorbing Speed of Aqueous Methanol Solution

A glass column of 4 mm in diameter and 200 mm in length was fixed vertically, the lower end of the glass column was filled with an absorbent cotton, the absorber was placed to fill about half the length of the column (100 mm), and the test region was set. From above the absorber in the glass column, 10 mL of an aqueous methanol solution of 5% concentration was dropped by a dropping pipette. When the aqueous methanol solution reached the upper end of the test region, it was defined as the start point, and when the aqueous methanol solution was gradually absorbed to reach the lower end of the test region, it was defined as the end point. The absorbing speed was calculated from the time spent from the start point to the end point. Results are shown in Table 1.

2) Absorbing Amount of Aqueous Methanol Solution

The same glass column as in 1) was filled with an absorbent cotton, and 20 g of the absorber was put thereon. An aqueous methanol solution of 5% concentration was dropped from above the absorber, and the state of saturation was confirmed when the solution began to leak out from the glass column, and each glass column was weighed.

The weight of the glass column, the weight of the absorbent cotton, and the weight of the absorber which had been preliminarily measured were subtracted from the obtained weight, and an absorbing amount of the aqueous methanol solution per unit weight (g) of absorber was calculated. Results are shown in Table 1.

3) Measurement of Volatility of Methanol

The swollen absorber containing the aqueous methanol solution in measurement of 2) was placed in an acrylic test container having a sampling hole of 1 m$^3$ in volume. Temperature in the test container was set at 60° C., inside air was sampled from the sampling hole four times at intervals of 5 minutes by using a microsyringe, and the methanol quantity was measured by gas chromatograph. Plotting time on the axis of abscissas and methanol concentration on the axis of ordinates, the methanol concentration was observed at time intervals, and the methanol diffusion speed (volatility rate) was calculated. Results are shown in Table 1.

4) Measurement of Swelling Degree

The same glass column as in 1) was filled with an absorber to a length of 100 mm. That is, the absorber length L0 was 100 mm. Then, an aqueous methanol solution of 5% concentration was dropped, and let stand for 5 minutes. From the absorber length L1 (mm) at that time, the swelling degree (%) was calculated in the following formula. Results are shown in Table 1.

Swelling degree (%)=(L1−L0)×100

5) Measurement of Thermal Decomposition

Sampling 10 g from the soda polyacrylate of Comparative example 1, thermal decomposition temperature in nitrogen gas was measured by using a differential thermal balance of a thermal analysis system (TG-DTA2020S (trademark) of Mac Science). At this time, the temperature rise speed was 10° C./min. The measured thermal decomposition temperature of the soda polyacrylate was T0 (° C.).

Sampling 10 g each from the absorbers in Examples 1 to 4, thermal decomposition temperatures T1, T2, T3, T4 (° C.) were measured similarly. The relative ratios of the thermal decomposition temperatures of the absorbers to the thermal decomposition temperature of the soda polyacrylate of Comparative example 1, that is, T1/T0, T2/T0, T3/T0, T4/T0 were determined. Results are shown in Table 1.

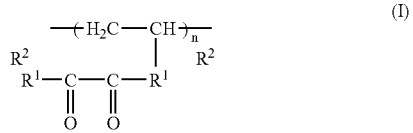

TABLE 1

| | Absorber | Absorbing speed (mm/sec) | Absorbing amount (g/absorber unit weight g) | Volatility rate ($10^{-3}$ ppm/s) | Degree of swelling (%) | Resistance to thermal decomposition (relative) |
|---|---|---|---|---|---|---|
| Example 1 | Polyvinyl (1,1'-oxalyl imidazole) hydrochloride | 5 | 20 | 2.0 | 15 | 1.3 |
| Example 2 | Polyvinyl (1,1'-oxalyl imidazole) bromide | 5 | 18 | 1.8 | 16 | 1.2 |
| Example 3 | Polyvinyl (1,1'-oxalyl imidazole) hydrofluoride | 4 | 17 | 1.6 | 18 | 1.1 |
| Example 4 | Polyvinyl (1,1'-oxalyl-2,2'-dimethyl imidazole) hydrochloride | 5 | 16 | 1.5 | 18 | 1.1 |
| Comparative Example 5 | Soda polyacrylate | 1 | 5 | 5 | 25 | 1.0 |

As is clear from Table 1, the absorbers (fuel absorbing members) of Examples 1 to 4 of the invention are high in absorbing speed and absorbing amount of the aqueous methanol solution (fuel) as compared with the absorber of soda polyacrylate, and are also low in volatility rate of methanol absorbed at a temperature near the boiling point of methanol, low in degree of swelling, and excellent in resistance to thermal decomposition, showing a relative value of more than 1 of resistance to thermal decomposition.

Estimating from such performances of the absorbers of Examples 1 to 4, by disposing each of the absorbers around the cell unit as the fuel absorbing member, the fuel is absorbed promptly and efficiently in the event of an unexpected leakage of the aqueous methanol solution (fuel) from the cell unit, so that a safe fuel cell which prevents leakage from the casing containing the cell unit can realized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the applied claims and their equivalents.

What is claimed is:

1. A fuel cell comprising:
a cell unit in which a plurality of single cells are laminated, each of which has a membrane type electrode unit including a fuel electrode to which an aqueous methanol solution is supplied as a fuel, an air electrode to which an oxidizing gas is supplied, and an electrolyte membrane interposed between the fuel electrode and the air electrode; and
a fuel absorbing member disposed around the cell unit, the fuel absorbing member being composed of a polymer represented by the following formula (I):

where $R^1$ denotes a cationic aromatic functional group; $R^2$ denotes an anion; and n is an integer of 2 or more.

2. The fuel cell according to claim 1, wherein the $R^1$ in the formula (I) is a cationic nitrogen containing aromatic functional group, and the $R^2$ is a halogen ion.

3. The fuel cell according to claim 1, wherein the n in the formula (I) is an integer of 2000 to 45000.

4. The fuel cell according to claim 1, wherein the polymer is represented by the following formula (II):

where $R^{11}$ and $R^{12}$ each denote a hydrogen or hydrocarbon group, which are either the same or different; $R^{13}$ denotes a halogen element; and n is an integer of 2 or more.

5. The fuel cell according to claim 4, wherein the hydrocarbon group of $R^{11}$, $R^{12}$ in the formula (II) is an alkyl group having 1 to 20 carbon atoms.

6. The fuel cell according to claim 4, wherein n in the formula (II) is 100 to 45000.

7. The fuel cell according to claim 1, the absorbing member is formed like a band, and is wound around the laminated surface of the cell unit.

8. The fuel cell according to claim 1, wherein the cell unit is further contained in a casing, and the absorbing member is disposed completely or partially within the casing.

9. The fuel cell according to claim 8, wherein the fuel absorbing member is attached in a membrane state in the inside of the casing.

* * * * *

UNITED STATES PATENT AND TRADEMARK OFFICE
CERTIFICATE OF CORRECTION

PATENT NO. : 7,632,598 B2  Page 1 of 1
APPLICATION NO. : 11/285654
DATED : December 15, 2009
INVENTOR(S) : Arimura et al.

It is certified that error appears in the above-identified patent and that said Letters Patent is hereby corrected as shown below:

On the Title Page

Delete, Item "(*) Notice: Subject to any disclaimer, the term of this patent is extended or adjusted under 35 U.S.C. 154(b) by 928 days. This patent is subject to a terminal disclaimer."

Signed and Sealed this

Tenth Day of August, 2010

David J. Kappos
*Director of the United States Patent and Trademark Office*